United States Patent Office 3,547,792
Patented Dec. 15, 1970

3,547,792
SOLVENT SHRINKABLE POLYMERIC
MATERIAL
William A. Patterson, Spartanburg, S.C., assignor to
W. R. Grace & Co., Duncan, S.C., a corporation of
Connecticut
No Drawing. Continuation of application Ser. No.
359,506, Apr. 13, 1964. This application Feb. 16,
1968, Ser. No. 705,894
The portion of the term of the patent subsequent to
Feb. 25, 1986, has been disclaimed
Int. Cl. B29f 5/00
U.S. Cl. 204—159.14                    4 Claims

ABSTRACT OF THE DISCLOSURE

An irradiated, stretch oriented, organic polyether which is shrinkable upon contact with a solvent for the non-irradiated polyether.

---

This application is a continuation of my co-pending application entitled "A Solvent Shrinkable Polymeric Material" filed on Apr. 13, 1964 and having Ser. No. 359,506, now Pat. No. 3,429,794.

This invention relates to a solvent shrinkable polymeric material. In one aspect, the invention relates to a shrinkable polyether. In one aspect, the invention relates to a method for shrinking a polymeric material.

It is well known that crystalline thermoplastic materials, such as polyethylene, polyvinyls and the like, may be highly oriented by stretching to produce a material which has a built-in memory so that upon the application of heat the oriented polymer, if not restrained, will return to its original dimensions. However, quite elevated temperatures (frequently above 212° F.) must normally be employed for the shrinking operation so that the application of the technique is limited to the packaging, etc., of items that are not damaged by exposure to elevated temperatures.

In addition a number of polymers are limited in their applications because they are highly soluble in common solvents such as water. Examples of these are the polyethers which are known polyvinyl materials including polymeric vinyl ethers and the polyalkylene oxides. The polyvinyl ethers are generally soft and tacky and have found utility as adhesives, but are generally not suitable for the manufacture of films. The polyalkylene oxides can be made into film but are water sensitive. Polyalkylene oxide, for example, is useful as a humectant, thickener or softener and is generally unsuitable for films or molded objects. Some of the higher polyalkylene oxides, such as polytetramethylene oxide, are more rigid and useful in moldings.

The object of the invention is to provide a shrinkable polymer.

Yet another object is to provide a novel shrinkable polyether.

Another object of the invention is to provide a method for shrinking a polymeric material, including the polyethers.

These and other objects of the invention will be readily apparent to those skilled in the art from the following discussion and appended claims.

These objects are broadly accomplished by reducing the solubility of a highly soluble polymeric material and orienting said material by stretching. The oriented material is then shrinkable by contacting same with a solvent for the untreated material.

It has been found that organic, thermoplastic, normally solid, polymeric materials which are generally highly soluble in solvents at ambient temperatures are generally less soluble in the same solvent after irradiation with accelerated electrons. Any suitable method may be used for reducing solubility such as the formation of association complexes by reaction with certain compounds such as phenolic resins, mineral acids, halogens, urea, lignin sulfonic acids and polycarboxylic containing compounds; however, irradiation is preferred.

Further and more surprisingly, the orientation of the irradiated material produces a film or filament which possesses considerable shrink energy upon contact with the solvent. It is also within the scope of the invention to orient the polymer prior to reducing its solubility.

This invention is broadly applicable to highly soluble polymers, such as organic polyethers. Particularly preferred are the polyethers having recurring chains at least 2 carbon atoms long. The preferred polyethers are characterized by the recurring structural unit —$(C_nH_{2n}O)$— where $n$ is a plural integer of not more than 10 and usually between 2 and 8. Such polymers are hydrocarbon except for the ether oxygen and are generally initially substantially non-rubbery and non-elastic at ordinary conditions of temperature. The invention is not to be limited to polyethers. The only requirements are that the polymer is highly soluble in a solvent, its solubility can be reduced such as by irradiation, and it can be highly oriented to provide a heat shrinkable polymer.

Polymers useful in this invention having a chain of at least 2 carbons include the polyalkylene oxides with the recurring unit $(CH_2)_n$—O— wherein $n$ is a plural integer of up to 4. Examples of these polyethers are polyethylene oxide and polytetramethylene oxide. A further class of hydrocarbon ethers are the polyvinyl ethers which have the unit.

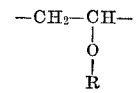

wherein R is a radical, generally hydrocarbon and preferably alkyl, or usually up to 8 carbons. Examples of such ethers are polymers of methyl vinyl ether, isopropyl vinyl ether, and 2-ethylhexyl vinyl ether. The preferred polymer is polyethylene oxide.

Although it is known that irradiation of a polymer will generally decrease the solubility of the polymer, it was most surprising to discover that the less soluble polymer, if oriented, possesses high shrink energy if contacted with a solvent for the non-irradiated material. The mechanism of this phenomenon is not known. However, it has been theorized that an oriented crystalline material shrinks upon the application of heat because the crystals melt thereby releasing the locked-in molecules permitting return to their more natural position. Perhaps the solvent performs the same function as heat—that is, the solvent dissolves the crystals instead of melting them. On the other hand, the rapidity of shrink on thin films is so rapid that it is difficult to believe that solvents can dissolve crystallites so quickly. Therefore, these results are all the more surprising. Obviously, this phenomenon is of no use on a highly soluble material because it will simply dissolve. However, if the solubility is first decreased, such as by irradiation, then only a small portion of the crystalline material will dissolve leaving a useful material. The invention is all the more useful if the temperature of the solvent is low, for example, ambient temperature, so that it is not necessary to exceed the crystalline melting point.

The crystalline melting point, i.e., temperature at which the crystalline nature of the polymer is destroyed or the transition temperature of the crystalline to the amorphous state, is readily determined by known methods. It is the temperature at or above which birefringence no longer occurs, and X-ray diffraction patterns indicate an amorphous structure (see, e.g., Weissberger, "Physical Methods in Organic Chemistry," Interscience, 1949, pages 885–6 and 1080–1). For the polymeric ethers, the crystalline melting point of the solid polymer is at least 35° C. and usually 35–100° C.

The crystalline polyethers are generally highly soluble at room temperature or thereabouts in common solvents including acetic acid, acetonitrile, chloroform, ethylene dichloride, isopropanol, methylene dichloride, carbon tetrachloride, benzene, dimethyl formamide, tetrahydrofuran, ethylene carbonate, methanol, methyl ethyl ketone, and water. The preferred solvent for polyethylene oxide herein is water.

The polymers are preferably employed as an elongated member, such as a film or filament formed by extruding the molten polymer through a die. For simplicity the invention is described with reference to a film. After formation of the film and cooling of same to solidify, it is subjected to irradiation by any suitable means such as disclosed in the patent to Baird et al., U.S. Pat. No. 3,022,543, and Rainer et al., U.S. Pat. No. 2,877,500. The polymer is subjected to sufficient dosage to reduce the solubility of the polymer in the solvent to be employed in the subsequent shrink operation. The dosage depends on the molecular weight and the structure of the molecule. Preferably the polymer is irradiated at a dosage of at least 1, more preferably 2 to 20 megarads.

A REP as recognized in the art is defined as that amount of nuclear irradiation which dissipates 93 ergs of energy per gram of tissue producing $1.61 \times 10^{12}$ ion pairs in the process. An alternative unit is the Rad which is defined as representing 100 ergs of energy per gram imparted by ionizing particles to the irradiated material at the point of interest, Glasstone "Principles of Nuclear Reactor Engineering," (1955) page 547.

The polymer is generally subjected to irradiation at ambient temperatures with the reduction in solubility proceeding more rapidly at elevated temperature; however, the temperature is less than the crystalline melt, more preferably less than 90° F. for polyethylene oxide.

The film or filament may be of any suitable dimensions so long as the irradiation is effective for reducing solubility of the polymer unit.

Irradiation can be accomplished by various methods. Thus, there can be used electrons, X-rays, gamma rays by employing iron 59 or cobalt 60, beta-rays, e.g., by employing cobalt 60, carbon 14, phosphorus 32, strontium 90, and ultra-violet light. Preferably, electrons of at least $10^5$ electron volts energy are employed. A suitable irradiation source is a Van de Graaff type electron accelerator manufactured by the High Voltage Engineering Corporation, Burlington, Mass., operated at 2,000,000 volts and a power output of 500 watts. Alternatively, there can be employed other sources of high energy electrons, such as the General Electric 2,000,000 volt, 10 kw., Resonant Transformer unit or the corresponding 1,000,000 volt, 5 kw., General Electric Resonant Transformer or a Linear accelerator.

The time of irradiation is not critical but need merely be sufficient to give a dosage of sufficient REP. The voltage, likewise, can be varied quite widely, but for rapid irradiation of thick or multi-layer materials is desirably high, e.g., 750,000 or 1,000,000 or 2,000,000 or 3,000,000 or 6,000,000 volts, or even higher. By appropriate combination of time of treatment, voltage and beam current, the desired dosage is obtained.

Subsequent to the irradiation of the polymeric member (although irradiation may take place after orientation), it is oriented monoaxially or biaxially or omniaxially by any suitable means such as by stretching or by inflating. The invention is not limited to any particular method of orientation. Orientation is discussed herein with reference to biaxial orientation (actually omniaxially oriented) wherein the molten polymer is extruded through an annular die to form a tube which is solidified. The tube or tape is then inflated by air pressure or any suitable fluid thereby biaxially orienting the polymer. The resulting bubble is deflated to form a flattened tubing or tape which may be slit to form a film.

The pressures for the formation of bubbles for the oriented materials are within the skill of the art and the invention is not so limited.

It has been surprisingly found that this oriented, irradiated material may be shrunk by mere contacting with a solvent. For example, a film of polyethylene oxide in an oriented state may be immersed in a water bath at approximately room temperature and considerable shrink force will develop immediately. Any solvent may be employed which is a solvent for the non-irradiated material, but which will not dissolve any substantial portion of the irradiated material. In the case of water, non-irradiated polyethylene oxide is completely soluble. It has been found that a suitable irradiated polyethylene oxide is one that has an increased insoluble content, preferably not less than 30%, even more preferably 50 to 90%. Insoluble content refers to the non-extractable portion of the irradiated oriented polymer in benzene. Since there is a three dimensional network, there is little difference in solubility of a given polymer in a specific solvent so long as sufficient solvent is used to insure that saturation has not occurred. Thus, the insolubility of the polymer in water is essentially the same as its insolubility in benzene. The irradiated oriented material will shrink to about its dimensions prior to orientation, or to at least within 125% of its original dimensions. An inch strip of about 1 mil thick oriented polymer will have a shrink energy of at least 0.1 lb., preferably 0.2–2.0 lb., determined as described in Example V. Shrink energy is the force of contraction at a given temperature when the material is restrained. More specifically, it is the measurable tension in a fully mono-directionally restrained strip of film when the film is heated to the specified temperature.

Preferably the solvent shrinking operation takes place at a temperature of 32° F. to 150° F., more preferably at ambient room temperature in the range of 50° F. to 90° F.

A prime advantage for the employment of a solvent, such as cold water, to shrink a biaxially oriented film or filament is that no heat need be applied to a product contained in the shrinkable film. The shrinkable film produced by the method of this invention has particular utility for shrink packaging.

The polymers may include additives such as stabilizers, antislip agents, antistatic agents, fillers, pigments and the like.

The invention is best illustrated by the following examples.

EXAMPLE I

The effect of irradiation on the solubility of polymers of ethylene oxide in water was determined. The resins were high molecular weight polymers of ethylene oxide having the following properties: [1]

TABLE I

Appearance _____ White granules.
Print point _____ 53° C.–55° C.
Melting point _____ 65° C.–67° C.
Brittle temperature, $T_b$ ____ −50° C.
Ash content, maximum (calculated as CaO) _____ 2.0 weight percent.
Particle size _____ 98%, minimum, will pass through ten mesh screen.
Moisture content (as shipped) _____ Less than 1.5 percent by weight of resin.

---

[1] All properties of the polymer were supplied by the manufacturer of polyox in an Advance Technical Information sheet dated Aug. 26, 1957, Union Carbide Chemicals Co., Division of Union Carbide Corp., 30 E. 42nd St., New York, N.Y.

TABLE II

Properties of aqueous solutions of the oriented polymer of ethylene oxide employed in the iradiation tests are as follows:

| Polymer | Viscosity, centipoises at 25° C.[1] | Melt viscosity, poises at 150° C. |
|---|---|---|
| A (5%)[2] | 225-375 | 15,000-16,000 |
| B (5%)[2] | 1,500-2,500 | 23,000-26,000 |
| C (1%)[2] | 2,000-4,000 | 100,000-110,000 |

[1] Measured by Brookfield Viscometer RVF at 2 r.p.m. and largest spindle for desired scale.
[2] Percent by weight of polymer in water based on total weight.

Four inch by 4 inch platens, about 15-25 mils thick, of polymers A, B and C were irradiated for a total dosage of 2, 4, 8 and 12 megarads in a 15 mil thick polyethylene container and subjected to 2 MEV at 18 feet per minute in an electron beam generator.

The irradiated platens were then biaxially oriented by inflating at 10 p.s.i. at 150° F. to form a "hat." The oriented film in the hats readily shrank with the application of heat (about 150° F.). Surprisingly the oriented film also developed high shrink energies when brought into contact with cold water (about 70° F.). The film readily returned to its platen thickness. Non-irradiated polymer had little or no shrink energy and simply dissolved in the cold water.

EXAMPLE II

Polyethylene oxide, polymer C (see Table II), was irradiated by the procedure described in Example I. The insoluble content of the irradiated polymer was determined by weighing the sample, and extracting in benzene in an apparatus designed for ASTM D-147 for 20 hours. The benzene insoluble portion was dried at reduced pressure in a vacuum oven at 55-60° C. for no less than 48 hours.

Results for two parallel samples were as follows:

TABLE III

| Dosage (megarads) | 0.8 | 2.0 | 3.2 | 4 | 8 | 12 | 20 |
|---|---|---|---|---|---|---|---|
| | Percent insolubles | | | | | | |
| Sample 1 | 32.6 | 43.0 | 54.9 | 55.8 | 65.3 | 66.2 | 69.4 |
| Sample 2 | 29.3 | 43.9 | 54.5 | 59.0 | 65.6 | 67.9 | 70.6 |

It is clearly evident from the above data that irradiation substantially reduces solubility of the polymer and that an increase in irradiation increases the insoluble content of the polymer.

EXAMPLE III

Polymer C, similar to that employed in Example I, was irradiated for a variable number of passes at a variable dose. The irradiated polymer was then biaxially oriented on a "hat tester" as hereinbefore described. The conditions and data are as follows:

The above data demonstrate that an irradiated polymer of ethylene oxide may be biaxially oriented over a broad range of irradiation and orientation conditions. Other samples at 1 pass and 2½ ma. (2 megarads) broke when inflated. The bubbles from runs 3 and 10 shrunk immediately when immersed in cold water. The films had a very high gloss. Irradiation not only improved processability but also reduced the susceptibility of the films to atmospheric moisture.

EXAMPLE IV

Solubility vs. irradiation dosage was determined on two different polymers of ethylene oxide.

Polymer E (Radel[1]) film was irradiated at 2.5 ma. for 2 and 6 passes.

Polymer resin D (Polyox MR) was extruded in the laboratory from a 2.5 inch die and irradiated at 2.5 ma. for 2 and 6 passes.

Tensile, longitudinal, p.s.i. _____ 8,000-10,000
Tensile, transverse, p.s.i. _____ *2,000-2,500
Elongation:
    Longitudinal, percent _____ *150
    Transverse, percent _____ *600
Tensile modulus, p.s.i. _____ *40,000
Solubility rate:
    20° C., release contents, seconds _____ 14
    20° C., complete solution, seconds _____ 120
    40° C., release contents, seconds _____ 7
    40° C., complete solution, seconds _____ 60

*ASTM D—882—56T.

Along with each of the samples above was included a polyethylene indicator tape from which the actual irradiation dosage was determined by infrared spectrophotometry. The irradiated samples were treated with benzene as described in Example II. The percent insolubles were as follows:

TABLE V

| Polymer | Percent insolubles | | |
|---|---|---|---|
| | 2.9 mr. | 11 mr. | 26 mr. |
| D | 18.9 | 27.9 | 44.1 |
| E | 12.1 | 18.1 | |

It will be seen from the above date that the effect of irradiation on gel content is different for different polymer resins.

EXAMPLE V

Polymer C (see Example I) was mixed in a Banbury mill with a plasticizer in a ratio of 76 weight parts polymer and 24 weight parts plasticizer and then extruded through a 2.5 inch die to form polymer G. Portions of the sample were irradiated at 5.8 and 5.2 megarads and

[1] Registered trademark, Union Carbide Chemicals Co., the following properties were supplied by the supplier:

TABLE IV

| Run No. | Irradiation conditions | | | Hat tester conditions | | | Bubble |
|---|---|---|---|---|---|---|---|
| | No. passes | Dose, milliamps | Megarads | Heater time, seconds | Air pressure, p.s.i. | Index time, seconds | |
| 1 | 5 | 5 | 20 | 25 | 10 | ¼ | Good. |
| 2 | 3 | 5 | 12 | 25 | 10 | ¼ | Do. |
| 3 | 2 | 5 | 8 | 25 | 10 | ¼ | Do. |
| 4 | 2 | 5 | 8 | 25 | 10 | ⅜ | Do. |
| 5 | 2 | 5 | 8 | 25 | 10 | ⅝ | Do. |
| 6 | 1 | 5 | 4 | 20 | 10 | ½ | Do. |
| 7 | 1 | 5 | 4 | 30 | 10 | ⅜ | Do. |
| 8 | 1 | 5 | 4 | 30 | 10 | ½ | Do. |
| 9 | 1 | 4 | 3 | 30 | 10 | ¼ | Do. |
| 10 | 1 | 4 | 3 | 30 | 10 | ½ | Do. |
| 11 | 1 | 4 | 3 | 30 | 10 | ½ | Do. |
| 12 | 1 | 2½ | 2 | 30 | 10 | ½ | Do. | biaxially oriented continuously. The properties of the irradiated, biaxially oriented polymer G are as follows:

| | | |
|---|---|---|
| Dosage, megarads | 5.8 | 5.2 |
| Gage, mils | 1.26–1.35 | 1.07–1.08 |
| Longitudinal tensile at 73° F., median, p.s.i. | 8,900 | 10,800 |
| Transverse tensile at 73° F., median, p.s.i. | 9,500 | 11,900 |
| Longitudinal elongation, percent median | 111 | 112 |
| Transverse elongation, percent median | 39 | 80 |
| Free shrink in water, 73° F.:[1] | | |
|    Longitudinal, percent | 55 | 52 |
|    Transverse, percent | 63 | 58 |

[1] The percent shrink is determined by measuring the change in distance between 10 centimeter marks along two axes, machine and transverse directions, of the film, after the sample has been submerged 5 sec. in water at 73° F.

| | Gage, mils | | Gage, mils | |
|---|---|---|---|---|
| Shrink in water at 73° F.: | | | | |
|   Shrink force, lbs., median: | | | | |
|     Longitudinal | .417 | 1.08 | .482 | 1.32 |
|     Transverse | .838 | 1.15 | .612 | 1.13 |
|   Shrink tension,[1] p.s.i., median: | | | | |
|     Longitudinal | 386 | | 417 | |
|     Transverse | 757 | | 570 | |
| Insolubility in benzene, percent ave. | 70.5 | | 71.4 | |

[1] The shrink tension is determined by measuring the force exerted by a one (1) inch wide strip mounted between two arms of a holder; one arm of which is stationary and the other is connected to an electronic strain gauge. Proper calibration of the strain gauge permits calculation of the force in pounds per square inch of cross-sectional area of the sample. The lowest thickness values are used in the calculations since it is assumed that the weakest point will be that of smallest cross-sectional area.

The unirradiated polymer of ethylene oxide dissolved rapidly in water. The above data show that irradiation of the polymer provides a polymer which will exert considerable shrink energy when cold water is applied.

While certain examples, structures, composition and process steps have been described for purposes of illustration, the invention is not limited to these. Variation and modification within the scope of the disclosure and the claims can readily be effected by those skilled in the art.

I claim:

1. An irradiated, stretch-oriented, organic polyether member being 30% to 90% insoluble in benzene, said polyether being shrinkable upon contact with a solvent for the non-irradiated polyether.

2. The member of claim 1 wherein the polyether is polyethylene oxide film shrinkable upon contact with water at a temperature in the range of 32° to 150° F.

3. The member of claim 2 wherein said water is in the temperature range from 50° to 90° F.

4. The member of claim 1 wherein said organic polyether member is 30 to 70% insoluble in benzene.

References Cited

UNITED STATES PATENTS

| | | | |
|---|---|---|---|
| 3,429,794 | 2/1969 | Patterson | 204—159.14 |
| 3,022,543 | 2/1962 | Baird et al. | 204—159.2 |
| 2,964,455 | 12/1960 | Graham | 204—159.14 |
| 2,877,500 | 3/1959 | Rainer et al. | 204—159.2 |

SAMUEL H. BLECH, Primary Examiner

RICHARD B. TURER, Assistant Examiner

U.S. Cl. X.R.

260—2, 91.2; 264—22